(12) United States Patent
Javora et al.

(10) Patent No.: US 7,172,703 B2
(45) Date of Patent: *Feb. 6, 2007

(54) METHOD OF RECLAIMING A WELL COMPLETION BRINE SOLUTIONS USING AN ORGANIC CHELANT

(76) Inventors: Paul H. Javora, 20914 Tongdale, Spring, TX (US) 77388; Qi Qu, 6131 Merry Pine Ct., Spring, TX (US) 77379

( * ) Notice: Subject to any disclaimer, the term of this patent is extended or adjusted under 35 U.S.C. 154(b) by 0 days.

This patent is subject to a terminal disclaimer.

(21) Appl. No.: 11/145,281

(22) Filed: Jun. 3, 2005

(65) Prior Publication Data

US 2005/0227875 A1    Oct. 13, 2005

Related U.S. Application Data

(63) Continuation-in-part of application No. 10/623,044, filed on Jul. 18, 2003.

(51) Int. Cl.
*B01D 15/00* (2006.01)
(52) U.S. Cl. ............ 210/666; 166/244.1; 166/267; 175/66; 210/722; 210/729; 210/912
(58) Field of Classification Search .......... 166/244.1, 166/267; 175/66; 210/688, 694, 699, 700, 210/712, 721, 722, 727, 729, 749, 912, 666
See application file for complete search history.

(56) References Cited

U.S. PATENT DOCUMENTS

| | | | | |
|---|---|---|---|---|
| 4,303,624 | A | * | 12/1981 | Dotson et al. ............. 423/184 |
| 4,465,598 | A | * | 8/1984 | Darlington et al. ......... 210/721 |
| 4,507,208 | A | * | 3/1985 | Simon et al. ............. 210/721 |
| 5,177,243 | A | | 1/1993 | Parker |
| 5,191,081 | A | | 3/1993 | Parker |
| 5,191,106 | A | | 3/1993 | Parker |
| 5,250,728 | A | | 10/1993 | Parker et al. |
| 5,284,972 | A | | 2/1994 | Parker et al. |
| 5,302,297 | A | * | 4/1994 | Barthrope ............ 210/728 |
| 5,449,822 | A | | 9/1995 | Parker et al. |
| 5,536,452 | A | | 7/1996 | Black |
| 5,547,583 | A | * | 8/1996 | Alexander ............ 210/666 |
| 5,587,022 | A | | 12/1996 | Black |
| 5,688,981 | A | | 11/1997 | Nonomura |
| 5,728,733 | A | | 3/1998 | Ptchelintsev |
| 5,783,527 | A | * | 7/1998 | Dobson et al. .......... 507/269 |
| 5,801,139 | A | | 9/1998 | Fair et al. |
| 5,821,215 | A | | 10/1998 | Crudden et al. |
| 5,837,644 | A | | 11/1998 | Nakanishi et al. |
| 5,869,441 | A | | 2/1999 | Fair et al. |
| 5,962,717 | A | | 10/1999 | Nonomura et al. |
| 5,989,353 | A | * | 11/1999 | Skee et al. ............. 134/2 |

OTHER PUBLICATIONS

The Merck Index, p. 8531, 1989.
Hampshire, Sep. 2000, *Product information: Hampshire N-acyl ED3A anionic chelating surfactants.*
Foxenberg, W.E., Society of Petroleum Engineers (SPE), 24784, Oct. 1992, *Optimizing the quality of high-density brines for maximum performance and economic value*, Budavari, S., ed., Oct. 1992.
Bridges, K.L., *Completion and Workover Fluids, Reclamation and/or disposal of used fluids and environmental considerations*, 2000.

* cited by examiner

*Primary Examiner*—Peter A. Hruskoci

(57) ABSTRACT

A method of reclaiming a well completion brine solution by using an organic chelant that is capable of discriminating between (i) iron and/or non-zinc heavy metals; and (ii) calcium and zinc. The chelant is of the formula:

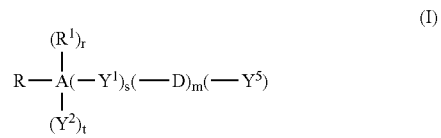

and may be either a neutral compound, a corresponding salt, or a corresponding quaternary salt, wherein:

D is F—A $(Y^3)_u(Y^4)_v$;
R is independently selected from $C_p$ or $C_pC(O)$;
$C_p$ is a $C_1$–$C_{36}$ hydrocarbyl group, optionally substituted with one or more substituents selected the group consisting of halogen, hydroxyl, sulfate, $CH_2CO_2Z$ or —$(CH_2)_nPO(OZ)_2$ groups;
each A is independently selected from —N and —P;
$Y^1$ is independently selected from J, —[(F)—A(J)]$_w Y^6$ and R;
J, $R^1$, $Y^2$, $Y^3$, $Y^4$, $Y^5$ and $Y^6$ are independently selected from the group consisting of —H, R, —$(F)_nCO_2Z$ and —$(CH_2)_nPO(OZ)_2$;
each F is independently selected from a $C_1$–$C_{12}$ hydrocarbyl group, optionally substituted with one or more substituents selected the group consisting of halogen, hydroxyl, sulfate, $CH_2CO_2Z$ or —$(CH_2)_nPO(OZ)_2$ groups;
Z is —H or a balanced counterion of an alkali or alkaline earth metal or $NH_4^+$;
m is 0 to 7;
n is 1 to 7;
r+s+t is 1 or 2;
u+v is 1 or 2; and
w is 0 to 7
provided when m is 0, no more than one of $R^1$, $Y^1$, $Y^2$ and $Y^5$ can be —H.

29 Claims, No Drawings

METHOD OF RECLAIMING A WELL COMPLETION BRINE SOLUTIONS USING AN ORGANIC CHELANT

This application is a continuation-in-part application of U.S. patent application Ser. No. 10/623,044, filed on Jul. 18, 2003.

FIELD OF THE INVENTION

The present invention relates to the reclamation of oil field completion fluids using an organic chelating agent.

BACKGROUND OF THE INVENTION

High density brines (completion brines) have been widely used in well completion and workover operations in oilfields in the past several decades. The completion brines are salt solutions typically having fluid densities ranging from about 8.4 ppg (pounds per gallon) to about 20 ppg. Depending on the density desired, a completion brine can be a one salt solution (e.g. NaCl, NaBr, $CaCl_2$, $CaBr_2$, $ZnBr_2$ or formate salt in water), a two salt solution (e.g. $CaCl_2/CaBr_2$ or $ZnBr_2/CaBr_2$), or a three salt solution (e.g. $ZnBr_2/CaBr_2/CaCl_2$). The composition of the brines determines the fluid properties such as pH, density, etc. Depending on the economics, a fluid can be used in a well and then purchased back to be cleaned and reused later.

At the conclusion of any completion or workover project, a substantial volume of contaminated or unneeded completion/workover fluid typically remains. Such fluids may be contaminated with any or all of the following: water, drilling mud, formation materials, rust, scale, pipe dope, and viscosifiers and bridging agents used for fluid-loss-control pills. Depending on their composition and level of contamination, these fluids may or may not have further practical or economic value. If it is deemed that the fluids have future use potential, they may be reclaimed. Conversely, if they are determined to have no further use, they must be disposed of in an environmentally responsible way.

The benefits derived from the use of solids-free fluids, and especially high-density brines, for completion and workover operations have been extensively documented in the literature. Unfortunately, the costs associated with the initial purchase and subsequent disposal of such brines has been a hindrance to their universal acceptance especially since the "use once and dispose" means of disposal is neither prudent nor economically sound.

Because of the relatively high cost and limited worldwide natural mineral resources available for producing medium- and high-density completion/workover fluids, it is essential that their used fluids be reclaimed. The reconditioned fluids must meet the same specifications as those of "new" or "clean" fluids. With respect to completion/workover fluids, the term "clean" denotes not only the absence of suspended solids but also the absence of undesirable colloidal or soluble species which are capable of undergoing adverse reactions with formation, formation fluids or other completion fluids to produce formation-damaging insoluble substances.

There are many known methods for removing contaminates from a brine solution. One approach is to remove suspended solids by filtration. Simple filtration processes, wherein the brine is filtered through a plate and frame type filter press with the use of a filter aid such as diatomaceous earth and then through a $2\mu$ cartridge polishing filter, are effective to remove solid contamination but they have no effect on removing other types of contamination such as colloidal or soluble species. This is the case since colloidally dispersed and soluble contaminants cannot be removed by this filtration without first treating the fluid to change the chemical and/or physical properties of the contaminants. The treatments required to salvage the fluid depend on the nature of the contaminants incorporated and their chemical and physical properties.

A common contaminant in completion fluids is created by iron. In most non-zinc containing brines, it is relatively easy to treat for iron though careful attention must be made by the analyst. Zinc containing high-density brines have proven to be the most difficult to treat for iron removal. Most of the zinc based brines have relatively low pH which often leads to high iron contamination during use as completion and/or workover fluids. Iron contamination in such fluids can reach several hundred or even thousand milligrams per liter. Further, iron in zinc brine solutions is more likely to be in a soluble and stable form. Because of the low solubility of oxygen in such solutions, a significant percentage of the iron contaminants exists as ferrous iron. As a result, precipitation of iron hydroxide with the addition of calcium hydroxide, calcium oxide, or other basic material is difficult to achieve because the brine is highly buffered through aqueous zinc hydroxide complexes, which makes it nearly impossible to raise the pH appreciably. Additionally the pH of these zinc-containing fluids cannot be adjusted above about 6.0. Nonetheless, adding lime or other basic (suspended) material to adjust brine pH can be an important step in the reclamation process which often consists of multiple steps, including filtration, pH adjustments, oxidation, etc.

One brine reclamation process of the prior art consists of the oxidation of polymeric species to reduce the viscosity and yield point of the contaminated brine, oxidation of $Fe^{++}$ to $Fe^{+++}$ to facilitate removal of iron, and the oxidation of organic species which interfere with the reclamation process.

Another brine reclamation process of the prior art consists of the initial filtration of the brine followed by a reduction in the pH of the brine fluid. Carbon or bentonite absorbent is then added to the brine and the solution is allowed to stand for about six hours. The resulting solids are then filtered and the pH of the resulting system is slowly raised. The fluid is then re-filtered and tested for compatibility.

Yet another multi-step reclamation process is disclosed in U.S. patent Pub. No. 2002/0130090. In this process, the spent brine is mixed with acid in order to lower the pH. The fluid is then contacted with a halogen, such as bromine, to increase the density. A reducing agent, such as anhydrous ammonia, is then added. An alkali is then used to neutralize any excess acid. Finally any suspended solid impurities are removed.

Such multi-step processes for reclaiming brine solutions are flawed. First, such processes often take very long to complete which, in turn, increases expenses as more man-hours and more hours of equipment usage are required to complete the reclamation. They are also expensive because they require the addition of multiple chemical agents. In many cases, pH adjustments lead to a reduction in the brine density and a reduction in the resale value of the brine. Further, quality assurance/quality control (QA/QC) is difficult to control in light of the multi-steps involved.

Therefore there exists a need for an improved method of reclaiming spent brine fluid. There is a need for a process that works independent of property changes to the system, such as pH and temperature. In addition, an improved process is needed which is easier to control in QA/QC.

SUMMARY OF THE INVENTION

The present invention relates to a method of reclaiming a well completion brine solution by use of an organic chelant. The organic chelant is capable of discriminating between (i) iron and/or non-zinc heavy metals; and (ii) calcium and zinc. The addition of the chelant causes formation of complex precipitates of the contaminants, which are then removed.

The organic chelant is of the formula:

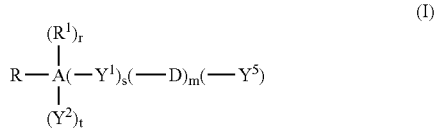
(I)

and may be either a neutral compound or a corresponding salt, including a quaternary salt, wherein:

D is $F-A(Y^3)_u(Y^4)_v$;

R is independently selected from $C_p$ or $C_pC(O)$;

$C_p$ is a $C_1$–$C_{36}$ hydrocarbyl group, optionally substituted with one or more substituents selected from the group consisting of halogen, hydroxyl, sulfate, $CH_2CO_2Z$ or $-(CH_2)_nPO(OZ)_2$ groups;

each A is independently selected from $-N$ and $-P$;

$Y^1$ is independently selected from J, $-[(F)-A(J)]_wY^6$ and R;

J, $R^1$, $Y^2$, $Y^3$, $Y^4$, $Y^5$ and $Y_6$ are independently selected from the group consisting of $-H$, R, $-(F)_nCO_2Z$ and $-(CH_2)_nPO(OZ)_2$;

each F is independently selected from a $C_1$–$C_{12}$ hydrocarbyl group, optionally substituted with one or more substituents selected the group consisting of halogen, hydroxyl, sulfate, $CH_2CO_2Z$ or $-(CH_2)_nPO(OZ)_2$ groups;

Z is $-H$ or a balanced counterion of an alkali or alkaline earth metal or $NH_4^+$;

m is 0 to 7;

n is 1 to 7;

r+s+t is 1 or 2;

u+v is 1 or 2; and w is 0 to 7.

provided when m is 0, no more than one of $R^1$, $Y^1$, $Y^2$ and $Y^5$ can be $-H$. Such organic chelants are highly effective in precipitating out unwanted impurities, especially when it contains one or more $-(F)_nCO_2Z$ or $-(CH_2)_nPO(OZ)_2$ groups.

DETAILED DESCRIPTION OF THE INVENTION

The organic chelant for use in the invention is capable of discriminating between (i) iron and/or non-zinc heavy metals; and (ii) calcium and zinc. Such chelating agents are capable of optimizing the complexation of the targeted metal which translates to greater effectiveness in removing the metal from the high density brine. The chelants may be applied to the brine in liquid or powder form.

The functional groups of the chelating agents may dissociate into one or more multiple anionic or nonionic functional groups. Such anionic or nonionic functional groups may interact with the higher valence states associated with transition metals.

The discrimination occurs in light of the differences in the equilibrium constant between the chelant and iron and non-zinc heavy metals and the equilibrium constant between the chelant and calcium and zinc. A representation of the reactions is as follows:

 (i)

 (ii)

Where $K_{eq1}$ is greater than $K_{eq2}$, the reaction proceeds with greater efficiency, thereby resulting in an increase in the number of chelant-Fe complexes.

The chelating agent for use in the invention generally contains about 4 to about 120 carbon atoms, most preferably from about 10 to about 80 carbon atoms, and is preferably of the formula:

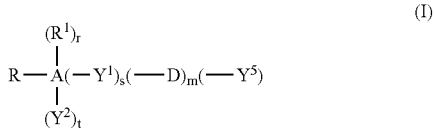
(I)

wherein:

D is $F-A(Y^3)_u(Y^4)_v$;

R is independently selected from $C_p$ or $C_pC(O)$;

$C_p$ is a $C_1$–$C_{36}$ hydrocarbyl group, optionally substituted with one or more substituents selected the group consisting of halogen, hydroxyl, sulfate, $CH_2CO_2Z$ or $-(CH_2)_nPO(OZ)_2$ groups;

each A is independently selected from $-N$ and $-P$;

$Y^1$ is independently selected from J, $-[(F)-A(J)]_w$, $Y^6$ and R;

J, $R^1$, $Y^2$, $Y^3$, $Y^4$, $Y^5$ and $Y^6$ are independently selected from the group consisting of $-H$, R, $-(F)_nCO_2Z$ and $-(CH_2)_nPO(OZ)_2$;

each F is independently selected from a $C_1$–$C_{12}$ hydrocarbyl group, optionally substituted with one or more substituents selected the group consisting of halogen, hydroxyl, sulfate, $CH_2CO_2Z$ or $-(CH_2)_nPO(OZ)_2$ groups;

Z is $-H$ or a balanced counterion of an alkali or alkaline earth metal or $NH_4^+$;

an alkali or alkaline earth metal or $NH_4^+$;

m is 0 to 7;

n is 1 to 7;

r+s+t is 1 or 2;

u+v is 1 or 2; and w is 0 to 7 provided when m is 0, no more than one of $R^1$, $Y^1$, $Y^2$ and $Y^5$ can be $-H$. Such chelants, as demonstrated in formula (I) may be a neutral compound, a corresponding salt, or a corresponding quaternary salt, such as salts of an acid containing a cation such as from Group 1, 2, 3, 4, 5, 6, or 7, $NH_4^+$, or a quaternary ammonium group.

A more preferred type of chelant is that represented by formula (I) wherein the $C_p$ group of R is a $C_{12}$–$C_{22}$ hydrocarbyl group and the formula contains one or more $-(F)_nCO_2Z$ or $-(CH_2)_nPO(OZ)_2$ groups.

One preferred type of chelant is that represented by formula (I) wherein s and t are both 0 and m is between from 1 to about 7. Such chelants include those of formula (II):

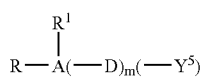

(II)

wherein D may represent random repeating blocks of F—A $(Y^3)_u(Y^4)_v$. Included with this group of chelants are those of formula (III):

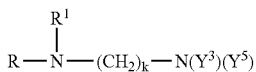

(III)

wherein $R^1$ is —H, —$(CH_2)_nPO(OZ)_2$ or —$(F)_nCO_2Z$; and $Y^3$ and $Y^5$ are independently selected from —$(F)_nCO_2Z$, —$(CH_2)_nPO(OZ)_2$ and —H; and k is from 1 to 6, more preferably k is 3. Specific examples of chelants of formula (III) include those of the structural formulae R—NH—$(CH_2)_k$—$NH_2$; R—N($CH_2COOZ$)—$(CH_2)_k$—$NH_2$; R—N($CH_2COOZ$)—$(CH_2)_k$—NH($CH_2COOZ$); R—NH—$(CH_2)_k$—NH($CH_2COOZ$); R—N($CH_2COOZ$)—$(CH_2)_k$—N($CH_2COOZ$)$_2$; R—NH—$(CH_2)_k$—N($CH_2COOZ$)$_2$, especially those wherein R is $C_p$ or $C_pC(O)$; $C_p$ having been defined above. In a more preferred embodiment, k is 3 and $C_p$ is 12 to 22.

Further preferred as compounds of formula (II) include compounds for formula (VI):

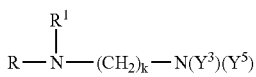

(VI)

especially wherein $Y^3$ is —H, $C_p$ or $C_pC(O)$, or —$(F)_nCO_2Z$ or —$(CH_2)_nPO(OZ)_2$; and $R^1$ and $Y^5$ are independently selected from —$(F)_nCO_2Z$, —$(CH_2)_nPO(OZ)_2$ and —H; and k is from 1 to 6, preferably when k is 3 and $C_p$ is 12 to 22.

Included within compounds of formula (VI) are chelants of the structural formulae R—N($R^1$)—$(CH_2)_k$—NH($CH_2COOZ$); R—N($R^1$)—$(CH_2)_k$—N($CH_2COOZ$)$_2$; R—NH—$(CH_2)_k$—$NY^5$($CH_2COOZ$); R—N($CH_2COOZ$)-$(CH_2)_k$—$NHY^5$; and R—N($CH_2COOZ$)—$(CH_2)_k$—$NY^5$($CH_2COOZ$).

Particularly preferred are those organic chelants of the formulae R—N($R^1$)—$(CH_2)_k$—N($CH_2COOZ$)$_2$ and R—N($CH_2COOZ$)—$(CH_2)_k$—$NY^5$($CH_2COOZ$) and R—N($CH_2COOZ$)—$(CH_2)_k$—N($CH_2COOZ$)$_2$.

Also suitable compounds are those of formula (I), wherein s, t and m are 0.

Such organic chelants include those compounds of formula (IV):

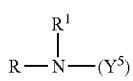

(IV)

wherein $R^1$ is —H or —$(F)_nCO_2Z$; $Y^5$ is —$(F)_nCO_2Z$. Especially suitable are those organic chelants of formula (IV-A):

R—NH($CH_2COOZ$) or R—N($CH_2COOZ$)$_2$ (IV-A).

Also preferred as organic chelants are those salts wherein s is 0, including the salts of formula (V):

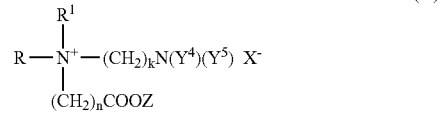

(V)

wherein $R^1$ is $C_p$, —$(CH_2)_nPO(OZ)_2$ or —$(CH_2)_nCO_2Z$; each of $Y^4$ and $Y^5$ are independently selected from —H, —$(CH_2)_nPO(OZ)_2$ or —$(CH_2)_nCO_2Z$; X is an anion; and k and n are independently selected from 1 to 6.

The organic chelants for use in the invention may exist in powder form. The powder may be introduced directly into the system or a slurry can be made which may then be introduced into the brine. In the field, introducing large amounts of powder, while effective, can create dusting problems. One alternative solution is to form a slurry containing the chelant. Such slurries should be formed from chemically neutral liquids such as water, glycols, and brine, preferably brine. The brine can be taken from the brine that needs to be treated or it can be a clean brine, such as calcium bromide brine with a density of 14.2 ppg. The amount of solvent used should be enough to create a slurry and to reduce dusting.

After the chelant is introduced into the spent brine, the treated brine is mixed for a time sufficient for the chelant to complex the metal. The time that is necessary depends on the amount and type of impurities in the brine. It is also dependent on the amount of chelant used. A typical mixing and resting time is from about 12 hours to about six days. The complexed metal may then be removed using known methods.

The chelant may be added with other treatment agents typically used in the industry. For example, it may be necessary to add an oxidizer to the system in order to oxidize iron and other transition metal impurities, or to destabilize interfering organic materials. Iron impurities often are present in the ferrous ($Fe^{++}$) state. This state is much more soluble than the ferric ($Fe^{+++}$) state. Therefore, in order to improve the effectiveness of the organic chelant, it may be necessary to add an oxidizer to ensure that the iron is in the ferric state. The oxidizer may be added to the brine with the chelant or may be added to the brine prior to or after the addition of chelant.

Acceptable oxidizers are preferably slow reacting oxidizers, such as calcium and magnesium peroxide, calcium hypochlorite, oxygen, and other slightly soluble oxidizing agents. Although all oxidizers capable of converting $Fe^{++}$ to $Fe^{+++}$ will work within the system, highly soluble, faster reacting oxidizers, such as hydrogen peroxide and sodium hypochlorite, have a tendency to react with the halides in the brine, which can release the corresponding halogen, especially bromine. Slow reacting oxidizers reduce the release of such halogens, and the amount of vapors passed into the atmosphere.

Other known processes may be used in conjunction with the complexation process discussed herein. For instance, it may be necessary to adjust the pH of the brine. For fluids containing colloidal iron, it is not uncommon to first lower the pH and then raise the pH. For calcium based fluids, raising the pH is typically achieved by having an excess of sodium hydroxide, magnesium hydroxide, magnesium oxide, lime, or quick lime suspended in the fluid. Final adjustment to the pH for the reclaimed brine may further be necessary.

Further, the complexation process of the invention may be used in conjunction with the addition of an absorbing or adsorbing material to augment the reclamation, such as activated carbon or clay.

Further, the process of the invention may further include a step of introducing an absorbing, adsorbing or defoaming material to the brine in order to augment the reclamation. Such absorbents, adsorbents and defoamers function to reduce the level of foaming generated during the reclamation process. Suitable for use as the absorbent are activated carbon, carbon black and clay, while suitable defoamers are the conventional defoaming agents including glycols, alcohols including long chain alcohols, silicones, and phosphates like tributylphosphate. The amount of absorbent or defoamer material added to the brine is sufficient to override the foaming nature of the organic chelant. Certain of the organic chelants of the invention are more likely to heavily foam than others. When needed, the amount of absorbent or defoamer added to the brine is between from about 1 oz. to about 5 lbs. per barrel of brine and may be added to the brine without removal of the complexed organic chelant. Typically, the absorbent or defoamer is added to the brine prior to filtration of the complexed organic chelant.

Another known addition may be that of reducing agents, such as sulfites, to reduce the oxidation state of iron and other metals to destabilize colloids. This is especially helpful for troublesome brines or to remove color due to organic species. For example, zinc has been used to reduce iron to iron metal for removal by filtration, and magnesium has been used to remove trace zinc and iron from brine.

The organic chelant may further be used in conjunction with a short-chain water-soluble alcohol or alcohol ether. The addition of the alcohol reduces the interfacial tension between the brine and the chelant and thus improves the dispersability of the chelant. When employed, the alcohol is typically present between from about 5 to about 30 weight percent based on the total weight of the chelating product and alcohol. Examples of the alcohol include, but are not limited to, ethylene glycol monobutyl ether, ethanol, isopropyl alcohol or mixtures thereof.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims, which follow.

In Examples 1–10, the following mono-, di- and tri-acetic acid derivatives of tallow diamine were employed as sodium salts wherein the tallow amine is derived from a mixture of $C_{14}$–$C_{22}$ beef tallow fats.

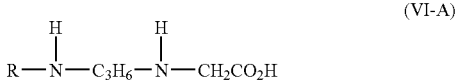
(VI-A)

-continued

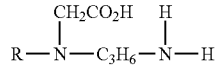
(VI-B)

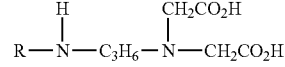
(VI-C)

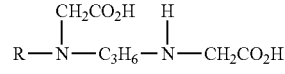
(VI-D)

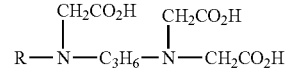
(VI-E)

EXAMPLE 1

A product was prepared as an aqueous solution containing 27% active material consisting of the sodium salts of (VI-A), (VI-B), (VI-C), (VI-D), and (VI-E). 0.0447 grams of this product (0.45 ppb) were added to 35 ml of stirred 16.8 ppg zinc bromide/calcium bromide/calcium chloride brine. The initial iron content was 100 mg/L (50 ppm). The product formed a gelatinous ball on the brine surface, which was pulverized and dispersed with a spatula into the brine vortex. The brine solution was stirred for 24 hours, after which a sample was taken, filtered, and the iron content in the filtrate was measured. The iron content was subsequently measured to be less than 10 mg/L (less than 5 ppm).

EXAMPLE 2

A product was prepared as an aqueous solution consisting of sodium salts of 1.6 wt. percent of (VI-A) and (VI-B), 12.9 wt. percent of (VI-C) and (VI-D), and 11.8 wt. percent of (VI-E). 0.1252 grams of this product (1.75 ppb) were added to 25 ml of stirred 17.4 ppg zinc bromide/calcium bromide/calcium chloride brine. The initial iron content was 450 mg/L (216 ppm). The product formed a gelatinous ball on the brine surface, which was pulverized and dispersed with a spatula into the brine vortex. The brine solution was stirred for 24 hours, after which a sample was taken, filtered, and the iron content in the filtrate was measured. The iron content was subsequently measured less than 2 mg/L (1 ppm).

EXAMPLE 3

The product of Example 2 was again synthesized as a 28% active solution, but in a much larger drum batch size, and subsequently tested in contaminated zinc-based high-density brine. 0.2974 grams of the product (2.08 ppb) were added to 50 ml of stirred 16.8 ppg zinc bromide/calcium bromide/calcium chloride brine. The initial iron content was 600 mg/L (298 ppm). The product was added to the vortex and dispersed with a spatula. The brine solution was stirred for 20 hours, after which a 2 ml sample was taken, filtered, and the iron content in the filtrate was measured. The iron content was subsequently measured at 150 mg/L (75 ppm). The bulk brine sample was stirred for another 20 hours, after which a 2 ml sample was taken, filtered, and the iron content in the filtrate was measured. The iron content was subsequently measured at 20 mg/L (10 ppm).

EXAMPLE 4

The product of Example 2 was synthesized as a 28% solution in the drum batch size, and subsequently tested in contaminated zinc-based high-density brine. 0.3419 grams of the product (2.39 ppb) were added to 50 ml of stirred 16.8 ppg zinc bromide/calcium bromide/calcium chloride brine. The initial iron content was 225 mg/L (112 ppm). The product was added to the vortex and dispersed with a spatula into the brine vortex. The brine solution was stirred for 16 hours, after which a 2 ml sample was taken, filtered, and the iron content in the filtrate was measured. The iron content was subsequently measured at 30 mg/L (15 ppm).

EXAMPLE 5

A product was prepared as a 28% aqueous solution similar to that described in Example 2. 0.1511 grams of this product (2.12 ppb) were added to 25 ml of stirred 17.4 ppg zinc bromide/calcium bromide/calcium chloride brine. The initial iron content was 450 mg/L (216 ppm). The product formed a gelatinous ball on the brine surface, which was pulverized and dispersed with a spatula into the brine vortex. The brine solution was stirred for 24 hours, after which a sample was taken, filtered, and the iron content in the filtrate was measured. The iron content was subsequently measured less than 2 mg/L (1 ppm).

EXAMPLE 6

A product was prepared as an aqueous solution consisting of sodium salts of 2.2 wt. percent of (VI-A) and (VI-B), 8.9 wt. percent of (VI-C) and (VI-D), and 8.0 wt. percent of (VI-E), and containing 17% ethyleneglycol monobutyl ether. 0.090 grams of the product (0.63 ppb) were added to 50 ml of stirred 16.8 ppg zinc bromide/calcium bromide/calcium chloride brine. The initial iron content was 125 mg/L (62 ppm). The product was added to the vortex and dispersed easily and completely into the brine. The brine solution was stirred for 16 hours, after which a sample was taken, filtered, and the iron content in the filtrate was measured. The iron content was subsequently measured at 20 mg/L (10 ppm).

EXAMPLE 7

0.158 grams of the product of Example 6 (1.11 ppb) were added to 50 ml of stirred 16.6 ppg zinc bromide/calcium bromide/calcium chloride brine. The initial iron content was 80 mg/L (40 ppm). The product was added to the vortex and dispersed easily and completely into the brine. The brine solution was stirred for 16 hours, after which a sample was taken, filtered, and the iron content in the filtrate was measured. The iron content was subsequently measured at 2 mg/L (1 ppm).

EXAMPLE 8

0.150 grams of the product of Example 6 (1.05 ppb) were added to 50 ml of stirred 16.4 ppg zinc bromide/calcium bromide/calcium chloride brine. The initial iron content was 150 mg/L (76 ppm). The product was added to the vortex and dispersed easily and completely into the brine. The brine solution was stirred for 16 hours, after which a sample was taken, filtered, and the iron content in the filtrate was measured. The iron content was subsequently measured less than 2 mg/L (1 ppm).

EXAMPLE 9

0.147 grams of the product of Example 6 (1.05 ppb) were added to 50 ml of stirred 15.7 ppg zinc bromide/calcium bromide/calcium chloride brine. The initial iron content was 125 mg/L (66 ppm). The product was added to the vortex and dispersed easily and completely into the brine. The brine solution was stirred for 16 hours, after which a sample was taken, filtered, and the iron content in the filtrate was measured. The iron content was subsequently measured at 25 mg/L (13 ppm).

EXAMPLE 10

0.292 grams of the product of Example 7 (2.04 ppb) were added to 50 ml of stirred 17.8 ppg zinc bromide/calcium bromide/calcium chloride brine that was obtained from the plant in a sealed glass jar. The initial iron content was 650 mg/L (305 ppm), essentially all as iron 2+The product was added to the vortex and dispersed easily and completely into the brine, after which the glass sample container was immediately sealed. The brine solution was stirred for 31 hours, and the jar was opened only long enough to obtain a sample to filter. The iron content in the filtrate was subsequently measured at 5 mg/L (2 ppm).

EXAMPLE 11

A product was prepared as an aqueous solution containing 28% active material containing sodium salts similar in structure to (VI-A) through (VI-E), except that the —CH$_2$CO$_2$H groups attached to nitrogen were —CH$_2$CH$_2$CO$_2$H groups. 0.0252 grams of this aqueous solution (0.25 ppb) were added to 35 ml of stirred 16.8 ppg zinc bromide/calcium bromide/calcium chloride brine. The initial iron content was 100 mg/L (50 ppm). The product formed a gelatinous ball on the brine surface, which was pulverized and dispersed with a spatula into the brine vortex. The brine solution was stirred for 24 hours, after which a sample was taken, filtered, and the iron content in the filtrate was measured. The iron content was subsequently measured to be less than 10 mg/L (less than 5 ppm).

From the foregoing, it will be observed that numerous variations and modifications may be effected without departing from the true spirit and scope of the novel concepts of the invention.

The invention claimed is:

1. A method of reclaiming a well completion brine comprising the steps of:
 (a.) mixing the brine containing metal impurities with a least one organic chelant for a time sufficient for the chelant to complex a metal and form a complexed metal precipitate, the organic chelant being a neutral compound or a corresponding salt of the formula:

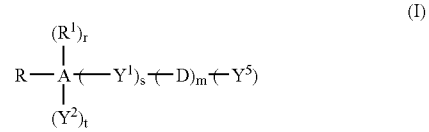

wherein:
 D is F—A(Y$^3$)$_n$(Y$^4$)$_v$;
 R is independently selected from C$_p$ or C$_p$C(O);

$C_p$ is a $C_1$–$C_{36}$ hydrocarbyl group, optionally substituted with one or more substituents selected the group consisting of halogen, hydroxyl, sulfate, $CH_2CO_2Z$ or —$(CH_2)_nPO(OZ)_2$ groups;

each A is independently selected from —N and —P;

$Y^1$ is independently selected from J, —$[(F)—A(J)]_wY^6$ and R;

J, $R^1$, $Y^2$, $Y^3$, $Y^4$, $Y^5$ and $Y^6$ are independently selected from the group consisting of —H, R, —$(F)_nCO_2Z$ and —$(CH_2)_nPO(OZ)_2$;

each F is independently selected from a $C_1$–$C_{12}$ hydrocarbyl group, optionally substituted with one or more substituents selected the group consisting of halogen, hydroxyl, sulfate, $CH_2CO_2Z$ or —$(CH_2)_nPO(OZ)_2$ groups;

Z is —H or a balanced counterion of an alkali or alkaline earth metal or $NH_4^+$;

m is 0 to 7;

n is 1 to 7;

r+s+t is 1 or 2;

u+v is 1 or 2; and w is 0 to 7 provided when m is 0, no more than one of $R^1$, $Y^1$, $Y^2$ and $Y^5$ can be —H; and (b.) removing the complexed metal precipitate from the brine wherein the metal impurities contain iron and further wherein the complexed metal precipitate contains iron.

2. The method of claim 1, wherein s and t are 0 and m is 1 to 7.

3. The method of claim 2, wherein the at least one organic chelant is a compound or a corresponding salt of the formula:

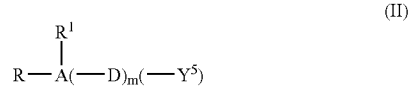
(II)

wherein D represents random repeating blocks of F—A$(Y^3)_u(Y^4)_v$.

4. The method of claim 3, wherein the at least one organic chelant is a compound of the formula:

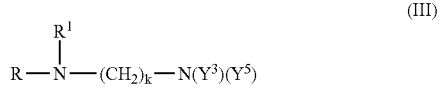
(III)

wherein $R^1$ is —H, —$(CH_2)_nPO(OZ)_2$ or —$(F)_nCO_2Z$; and $Y^3$ and $Y^5$ are independently selected from —$(F)_nCO_2Z$, —$(CH_2)_nPO(OZ)_2$ and —H; and k is from 1 to 6.

5. The method of claim 4, wherein k is 3.

6. The method of claim 5, wherein at least one organic chelant is selected from the group consisting of:
(a.) R—N($CH_2COOZ$)—$(CH_2)_k$—NH($CH_2COOZ$);
(b.) R—N($CH_2COOZ$)—$(CH_2)_k$—N($CH_2COOZ$)$_2$;
(c.) R—NH—$(CH_2)_k$—N($CH_2COOZ$)$_2$;
wherein R is $C_p$ or $C_pC(O)$.

7. The method of claim 6, wherein the $C_p$ group is selected from $C_8$ to $C_{36}$.

8. The method of claim 7, wherein the $C_p$ group is selected from $C_{12}$ to $C_{36}$.

9. The method of claim 8, wherein the $C_p$ group is selected from $C_{12}$ to $C_{22}$.

10. The method of claim 6, wherein k is 3, Z is —H and R is a $C_{14}$–$C_{22}$ hydrocarbyl group.

11. The method of claim 4, wherein the at least one organic chelant is selected from the group consisting of:
(a.) R—N($CH_2COOZ$)—$(CH_2)_k$—$NH_2$;
(b.) R—N($CH_2COOZ$)—$(CH_2)_k$—NH($CH_2COOZ$)
(c.) R—NH—$(CH_2)_k$—NH($CH_2COOZ$)
(d.) R—N($CH_2COOZ$)—$(CH_2)_k$—N($CH_2COOZ$)$_2$;
(e.) R—NH—$(CH_2)_k$—N($CH_2COOZ$)$_2$;
wherein R is $C_p$ or $C_pC(O)$.

12. The method of claim 11, wherein k is 3.

13. The method of claim 11, wherein k is 3, R is a $C_{14}$–$C_{22}$ hydrocarbyl group and Z is —H.

14. The method of claim 3, wherein at least one $R^1$, $Y^3$ or $Y^5$ is —$(F)_nCO_2Z$ or —$(CH_2)_nPO(OZ)_2$.

15. The method of claim 2, wherein the at least one organic chelant is a compound of the formula:

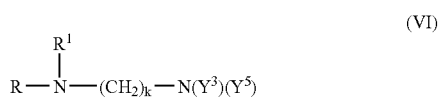
(VI)

wherein $Y^3$ is —H, $C_p$ or $C_pC(O)$, —$(F)_nCO_2Z$ or —$(CH_2)_nPO(OZ)_2$; and $R^1$ and $Y^5$ are independently selected from —$(CH_2)_nPO(OZ)_2$, —$(F)_nCO_2Z$ and —H; and k is from 1 to 6.

16. The method of claim 15, wherein k is 3.

17. The method of claim 15, wherein the at least one organic chelant is selected from the group consisting of:
(a.) R—N ($R^1$)—$(CH_2)_k$—NH($CH_2COOZ$);
(b.) R—N ($R^1$)—$(CH_2)_k$—N($CH_2COOZ$)$_2$;
(c.) R—NH—$(CH_2)_k$—$NY^5$($CH_2COOZ$);
(d.) R—N($CH_2COOZ$)—$(CH_2)_k$—$NHY^5$;
(e.) R—N($CH_2COOZ$)—$(CH_2)_k$—$NY^5$($CH_2COOZ$).

18. The method of claim 17, wherein the at least one organic chelant is selected from the group consisting of R—$NR^1$—$(CH_2)_k$—N($CH_2COOZ$)$_2$; R—N($CH_2COOZ$)—$(CH_2)_k$—N($CH_2COOZ$)$_2$; and R—N($CH_2COOZ$)—$(CH_2)_k$—$NY^5$($CH_2COOZ$).

19. The method of claim 17, wherein each Z is —H.

20. The method of claim 17, wherein $R^1$ is —$(F)_nCO_2Z$ or —H.

21. The method of claim 2, wherein the at least one organic chelant is a compound of the formula:

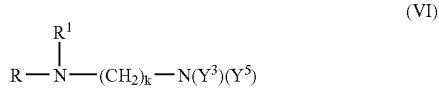
(VI)

wherein $Y^3$ is —H, $C_p$ or $C_pC(O)$, —$(F)_nCO_2Z$ or —$(CH_2)_nPO(OZ)_2$; and $R^1$ and $Y^5$ are independently selected from —$(F)_nCO_2Z$, —$(CH_2)_nPO(OZ)_2$ and —H; k is from 1 to 6; and at least one $R^1$, $Y^3$ or $Y^5$ is —$(F)_nCO_2Z$ or —$(CH_2)_nPO(OZ)_2$.

22. The method of claim 1, wherein s, t and m are 0.

23. The method of claim 22, wherein the at least one organic chelant is a compound of the formula:

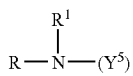

(IV)

wherein $R^1$ is —H, —$(CH_2)_n PO(OZ)_2$ or —$(F)_n CO_2 Z$; and $Y^5$ is —$(F)_n CO_2 Z$ or —$(CH_2)_n PO(OZ)_2$.

24. The method of claim 23, wherein the at least one organic chelant is a compound of the formula:

R—NH($CH_2COOZ$) or R—N($CH_2COOZ$)$_2$.

25. The method of claim 1, wherein the at least one organic chelant is a salt and further wherein s is 0.

26. The method of claim 25, wherein the salt is a compound of the formula:

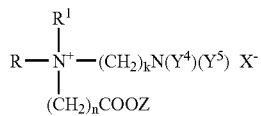

(V)

wherein $R^1$ is —H, $C_p$, —$(CH_2)_n PO(OZ)_2$ or —$(CH_2)_n CO_2 Z$; each of $Y^4$ and $Y^5$ are independently selected from —H, —$(CH_2)_n PO(OZ)_2$ or —$(CH_2)_n CO_2 Z$; X is an anion; and k and n are independently selected from 1 to 6.

27. The method of claim 1, further comprising adding to the brine an absorbent, adsorbent or defoamer in an amount sufficient to reduce foaming.

28. The method of claim 1 wherein at least one J, $R^1$, $Y^2$, $Y^3$, $Y^4$, $Y^5$ or $Y^6$ is —$(F)_n CO_2 Z$ or —$(CH_2)_n PO(OZ)_2$.

29. A method of reclaiming a well completion brine comprising the steps of:

(a.) mixing the brine containing metal impurities with an organic chelant for a time sufficient for the chelant to complex a metal and form a complexed metal precipitate, wherein the organic chelant is at least one member selected from the group consisting of R—N ($R^1$)—$(CH_2)_k$—N($CH_2COOZ$)$_2$; R—N($CH_2COOZ$)—$(CH_2)_k$—N($CH_2COOZ$)$_2$; and R—N($CH_2COOZ$)—$(CH_2)_k$—N$Y^5$($CH_2COOZ$)

wherein

R is independently selected from $C_p$ or $C_p C(O)$;

$C_p$ is a $C_{12}$–$C_{36}$ hydrocarbyl group, optionally substituted with one or more substituents selected from the group consisting of halogen, hydroxyl, sulfate, $CH_2CO_2Z$ or —$(CH_2)_n PO(OZ)_2$ groups;

$R^1$ and $Y^5$ are independently selected from —H, R, —$(F)_n CO_2 Z$ or —$(CH_2)_n PO(OZ)_2$;

each F is independently selected from a $C_1$–$C_{12}$ hydrocarbon group, optionally substituted with one or more substituents selected the group consisting of halogen, hydroxyl, sulfate, $CH_2CO_2Z$ or —$(CH_2)_n PO(OZ)_2$ groups;

Z is —H or a balanced counterion of an alkali or alkaline earth metal or $NH_4^+$;

n is 1 to 7; and k is from 1 to 6; and (b.) removing the complexed metal precipitate from the brine wherein the metal impurities contain iron and further wherein the complexed metal precipitate contains iron.

* * * * *

UNITED STATES PATENT AND TRADEMARK OFFICE
CERTIFICATE OF CORRECTION

PATENT NO. : 7,172,703 B2
APPLICATION NO. : 11/145281
DATED : February 6, 2007
INVENTOR(S) : Javora et al.

It is certified that error appears in the above-identified patent and that said Letters Patent is hereby corrected as shown below:

Title page, item [73]

Assignee not listed, assignee should be "BJ Services Company"

Column 10, line 66, replace "$F-A(Y^3)_n(Y^4)_v$," with --$F-A(Y^3)_u(Y^4)_v$--

Column 14, line 17, replace "$R^{1\ and\ Y5}$" with --$R^1$ and $Y^5$--

Signed and Sealed this

Twenty-fourth Day of July, 2007

JON W. DUDAS
*Director of the United States Patent and Trademark Office*